UNITED STATES PATENT OFFICE.

MOSE WILBUSCHEWITSCH, OF NISCHNINOVGOROD, KANAVINO, RUSSIA.

PROCESS OF REGENERATING CONSUMED CATALYSTS.

1,022,347.    Specification of Letters Patent.    Patented Apr. 2, 1912.

No Drawing. Original application filed January 12, 1911, Serial No. 602,322. Divided and this application filed July 19, 1911. Serial No. 639,453.

*To all whom it may concern:*

Be it known that I, MOSE WILBUSCHEWITSCH, factory director, a subject of the Russian Emperor, and resident of Nischninovgorod, Kanavino, Russia, have invented certain new and useful Improvements in Processes of Regenerating Consumed Catalysts, of which the following is a specification.

My invention relates to improvements in a process of regenerating consumed catalysts and more particularly such catalysts which have been used for reducing fats by a contact process. And the object of the improvements is to provide a process whereby the economy in the treatment of fats and other substances by means of a contact process is increased.

In describing the invention reference will be had to the regeneration of a catalyst which has been used in the reduction of fats.

My improved process is carried out as follows: From the consumed catalyst, which consists of pumice stone or any other porous inorganic carrier impregnated with nickel, iron or copper-salts, the foreign matter is first removed. In cases in which the catalyst has been used for treating fats, the said foreign matter consists of oil. Suitable means for removing such foreign matter consists of benzin, or any other equivalent solvent, which means after having first been treated with the solvent, are then subjected to vacuum. The oil contained in the residue is saponified by means of lye, by which the last traces of the oil are removed, whereupon the mass is treated with an acid, so as to separate the fatty acids which are removed from the surface of the material by skimming. The mass which has thus been freed from the oil, is then treated with sodium-carbonate, whereby the metal salt is transformed into the carbonate. The latter is heated until it is converted into the oxid, and the oxid is reduced by means of hydrogen to form a finely-divided pyrophoric metal. When it is desired to again use the product obtained by the regeneration for reducing oil, it is ground with oil, so that a coherent liquid having the character of an emulsion is obtained.

I claim:

1. The herein described process of regenerating catalysts, which consists in separating the foreign matter from the said catalyst, separating the fatty acids, treating the same with an acid for dissolving the metal contained in the catalyst, transforming the metal-salt into the carbonate, transforming the carbonate into the oxid, and reducing the oxid to the metal.

2. The herein described process of regenerating catalysts, which consists in separating from the said catalysts the major portion of the oil, saponifying the oil still contained in the residue, treating the same with an acid for dissolving the metal contained in the catalyst, removing the fatty acids obtained thereby, transforming the metal-salt into the carbonate, transforming the carbonate into the oxid, and reducing the oxid to the metal.

3. The herein described process of regenerating catalysts which consists in separating the major portion of the oil from the said catalyst, saponifying the oil still contained in the residue, treating the same with acid, removing the fatty acids obtained thereby, transforming the metal-salt into the carbonate, transforming the carbonate into the oxid, reducing the oxid into the metal, and grinding the metal with oil into an emulsion.

In testimony, that I claim the foregoing as my invention, I have signed my name in presence of two subscribing witnesses.

MOSE WILBUSCHEWITSCH.

Witnesses:
HENRY HASPER,
WOLDEMAR HAUPT.